(12) United States Patent
Morys (10) Patent No.: US 7,800,513 B2
(45) Date of Patent: Sep. 21, 2010

(54) HIGH PERFORMANCE COMMUNICATION SYSTEM

(75) Inventor: Marian Morys, Downingtown, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 75 days.

(21) Appl. No.: 12/352,335

(22) Filed: Jan. 12, 2009

(65) Prior Publication Data
US 2009/0146837 A1 Jun. 11, 2009

Related U.S. Application Data

(62) Division of application No. 11/253,363, filed on Oct. 19, 2005, now Pat. No. 7,490,428.

(51) Int. Cl.
G01V 3/00 (2006.01)
(52) U.S. Cl. ............. 340/853.1; 340/853.3; 340/855.4; 166/72; 367/6; 702/11
(58) Field of Classification Search ............. 340/853.1, 340/855.4, 853.3; 166/72; 367/6; 702/6, 702/11
See application file for complete search history.

(56) References Cited

U.S. PATENT DOCUMENTS

| | | | |
|---|---|---|---|
| 4,718,011 A | 1/1988 | Patterson | |
| 4,797,668 A * | 1/1989 | Zimmer | 340/855.6 |
| 4,931,737 A | 6/1990 | Hishiki | |
| 5,010,333 A * | 4/1991 | Gardner et al. | 340/855.3 |
| 5,144,126 A | 9/1992 | Perry et al. | |
| 5,160,925 A | 11/1992 | Dailey et al. | |
| 5,216,242 A | 6/1993 | Perry et al. | |
| 5,235,285 A | 8/1993 | Clark et al. | |
| 5,251,708 A | 10/1993 | Perry et al. | |
| 5,278,550 A | 1/1994 | Rhein-Knudsen et al. | |
| 5,331,318 A | 7/1994 | Montgomery | |
| 5,339,037 A | 8/1994 | Bonner et al. | |
| 5,691,712 A | 11/1997 | Meek et al. | |
| 5,861,771 A | 1/1999 | Matsuda et al. | |
| 6,252,518 B1 | 6/2001 | Laborde | |
| 6,332,109 B1 | 12/2001 | Sheard et al. | |
| 6,369,718 B1 * | 4/2002 | Mathieu | 340/853.7 |
| 6,626,251 B1 | 9/2003 | Sullivan et al. | |
| 6,688,396 B2 | 2/2004 | Floerke et al. | |
| 6,717,501 B2 | 4/2004 | Hall et al. | |
| 7,139,218 B2 | 11/2006 | Hall et al. | |
| 7,145,472 B2 | 12/2006 | Lilly et al. | |
| 7,207,396 B2 | 4/2007 | Hall et al. | |
| 2002/0043369 A1 | 4/2002 | Vinegar et al. | |
| 2003/0010493 A1 * | 1/2003 | Hill et al. | 166/65.1 |
| 2004/0124837 A1 | 7/2004 | Prammer et al. | |

(Continued)

Primary Examiner—Timothy Edwards, Jr.
(74) Attorney, Agent, or Firm—Krueger Iselin LLP (57) ABSTRACT

A system for communicating information in a borehole between tool assemblies in a tool string includes receiving an information signal and separating a first signal that may be a power and low speed signal. A second signal is separated and demodulated from the information signal. The first signal and second signal are transmit to electronic devices that process data from an earth formation. After the first and second signals are transmit to one or more electronic devices, the signals are modulated and/or filtered and then combined into the information signal. The first signal is at one frequency and the second signal is at a different frequency. The apparatus includes a main signal line that couples to a second signal line and third signal line in the tool assembly.

11 Claims, 6 Drawing Sheets

U.S. PATENT DOCUMENTS

| | | |
|---|---|---|
| 2005/0067190 A1 | 3/2005 | Tabanou et al. |
| 2006/0062249 A1 * | 3/2006 | Hall et al. .................. 370/468 |
| 2006/0089816 A1 * | 4/2006 | Sinha et al. .................. 702/85 |
| 2006/0221768 A1 * | 10/2006 | Hall et al. .................. 367/82 |
| 2007/0103161 A1 | 5/2007 | San Martin et al. |

* cited by examiner

HIGH PERFORMANCE COMMUNICATION SYSTEM

TECHNICAL FIELD OF THE INVENTION

The present application is a divisional of U.S. patent application Ser. No. 11/253,363, entitled "High Performance Communication System" filed Oct. 19, 2005. The present invention relates to a communication system capable of operating in difficult environmental conditions. More particularly, the present invention relates to a high bandwidth and high speed communication system that allows tool assemblies in a borehole tool string to communicate with each other and transfer large amounts of information.

BACKGROUND OF THE INVENTION

Petroleum drilling and production operations require large quantities of information relating to parameters and conditions downhole. Such information typically includes characteristics of the earth formations traversed by the borehole, along with data relating to the size and configuration of the borehole itself. The collection of information relating to conditions downhole, which commonly is referred to as "logging," may be performed by several techniques that may require the transmission of large quantities of information through the borehole.

In conventional oil well wireline logging, a tool string containing a number of tool assemblies that may each include sensors, actuators, memory, and processors is lowered into the borehole after some or all of the well has been drilled. The tool string is used to determine characteristics of the earth formations traversed by the borehole. The upper end of the tool string is attached to a multi-conductor wireline cable that suspends the tool string in the borehole. A downhole communication bus coupled to the wireline cable travels through the length of the tool string, connecting the tool assemblies together. Power may be transmitted to the sensors and instrumentation in each of the tool assemblies through the single conductive wireline. Instrumentation in the tool string may communicate information to the surface by using a modem to transmit signals through the downhole communication bus and wireline cable.

Another technique for the collection of information relating to downhole conditions and formation properties is known as "logging-while-drilling" or "LWD." LWD techniques include the collection of data during the process of drilling the borehole. Collecting and processing data during the drilling process eliminates the necessity of removing the drilling assembly to insert a wireline logging tool string. It consequently allows the drill operator to make accurate modifications or corrections as needed to optimize performance while minimizing down time.

Once information from the borehole is gathered, it may be necessary to communicate it to other tool assemblies in the tool string and to the surface for use and analysis by the tool operator. Thus, for example, in an LWD system, the direction and inclination of the drill bit and downhole motor may be needed by tool assemblies in the tool string so that the tool string may be steered in the correct direction. Additionally, information may be required by the tool operator concerning the nature of the strata being drilled, such as the formation's resistivity, velocity, porosity, density and its measure of gamma radiation. The tool operator may want to know other downhole parameters, such as the temperature and the pressure at the base of the borehole.

Collection of information may be done by a number of separate tool assemblies that form the tool string. As mentioned above, the tool assemblies may have to communicate with each other to transmit information collected by one tool assembly to another tool assembly. Thus, a tool assembly that connects to the drill bit and downhole motor may frequently need to communicate the direction and inclination information to another tool assembly that adjusts the steering of the tool string. In some scenarios, a tool assembly may need to transmit information to all tool assemblies in the tool string, thus requiring a "global broadcast" capability. Finally, each tool assembly in the tool string may gather information concerning the nature of the earth strata being drilled and transmit this information through other tool assemblies to a central recorder located on-board the tool string that records the information. Due to power and technology limitations, existing LWD tool strings with a single wire communication bus have limited throughput.

Various techniques to increase the communication bandwidth and the speed of information transfer between tool assemblies in a tool string have been suggested. These techniques include increasing the data transmission rate over the single wire connecting tool assemblies or increasing the number of wires connecting tool assemblies to implement parallel information transfers. However, such techniques increase power consumption, are not compatible with existing tool assemblies, and require substantial redesign and modification of these assemblies. Thus, there is a continuing need for a high speed, high bandwidth communication system that allows tool assemblies to transfer large quantities of data to each other which is compatible with existing tool assemblies.

SUMMARY OF THE INVENTION

According to some embodiments of the invention, a method is provided for communicating information in a borehole. The method includes receiving an information signal and separating a first signal that may be a power and low speed signal from the information signal. The first signal may be transmit and used by one or more electronic devices, wherein the electronic devices process data from an earth formation. The electronic devices may be a processor, sensor, memory, or actuator. A second signal is demodulated and separated from the information signal. The second signal may be a high speed signal. The method includes verifying if information in the second signal may be determined. If information from the second signal may not be determined, the system indicates that the second signal is corrupted. If information from the second signal may be determined, the system transmits the second signal to one or more electronic devices for use by the electronic devices. The electronic devices process data from an earth formation. After the first and second signals are transmit to the one or more electronic devices, the second signal is modulated and high pass filtered and the first signal is low pass filtered. The first signal and the second signal are then combined into the information signal. In some embodiments of the invention, the first signal is at one frequency and the second signal is at a different frequency. The information signal is transmit to a tool assembly capable of detecting hydrocarbon formations and a central recorder that stores the signal.

According to some embodiments of the invention, a system for communicating information in a borehole comprises a main signal line including a first signal and a second signal. The first signal is a power and low speed signal. The second signal is a high speed signal. The first signal and second signal are at different frequencies, the first signal and the second signal including data from an earth formation. The system also includes a second signal line coupled to the main signal line, the second signal line capable of receiving the first signal. One or more electronic devices capable of processing the data from the first signal are coupled to the second signal line. A third signal line couples to the main signal line, the third signal line capable of receiving the second signal. One or more electronic devices capable of processing the data from the second signal are coupled to the third signal line. The electronic devices may be a processor, sensor, memory, or actuator. The communication system also includes a plurality of communication links, wherein the main signal line, the second signal line, and the third signal line couple to each other through the communication link. Each of the communication links includes a low pass filter and high pass filter coupled to the main signal line, and a modulator/demodulator coupled to the high pass filter. A plurality of connection modules each contain the main signal line and each attach to a communication link. Each of the connection modules may be a pin or a box. The connection modules attach together to form a tool string. A system power return coupled to each of the plurality of connection modules is also present in the communication system.

According to some other embodiments of the invention, a borehole tool string for determining earth formation characteristics comprises a plurality of first tool assemblies and a plurality of second tool assemblies attached to the first tool assemblies. The tool assemblies each have a first end and a second end. Either end of a tool assembly may attach to a first tool assembly or second tool assembly. Each of the first end and second end of a tool assembly attach to a connection module. Each of the second tool assemblies comprises a main signal line including a first signal and a second signal. The first tool assemblies attach to the main signal line. Each of the first tool assemblies further comprises one or more electronic devices coupled to the main signal line. The first signal and second signal are at different frequencies, wherein the first signal and second signal include data from an earth formation. Each of the second tool assemblies includes a second signal line coupled to the main signal line, the second signal line capable of receiving the first signal. The second tool assemblies each further comprise a third signal line coupled to the main signal line, the third signal line capable of receiving the second signal. Each of the second tool assemblies also includes one or more electronic devices coupled to the second signal line and third signal line, the electronic devices capable of processing the data from the first signal and the second signal. The electronic devices may be a processor, sensor, memory, or actuator.

BRIEF DESCRIPTION OF THE DRAWINGS

For a detailed description of the embodiments of the invention, reference will now be made to the accompanying drawings in which.

While the embodiments of the invention are susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The term "couple" or "couples" is intended to mean either an indirect or direct electrical connection. Thus, if a first device couples to a second device, that connection may be through a direct electrical connection, or through an indirect electrical connection via other devices and connections. Also, the term "attached" is intended to mean either an indirect or direct physical connection. Thus, if a first device attaches to a second device, that connection may be through a direct physical connection, or through an indirect physical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the earth; but rather, describes only the relative placement of the surface and subsurface pieces of equipment. The term modulation, in the context of this disclosure, means shifting a signal to a higher frequency band. Demodulation, in the context of this disclosure, means shifting a signal to a lower frequency band.

DETAILED DESCRIPTION OF EMBODIMENTS

A high performance communication system is described that allows tool assemblies to transfer large quantities of data to each other at high speeds. A single wire cable running the length of the tool string has two communication channels at different frequencies. A low speed communication channel includes a low speed signal over one band of frequencies. A high speed communication channel contains a high speed signal over a different band of frequencies.

In some embodiments of the invention, the high speed communication channel is added on top of the existing low speed communication channel in tool assemblies present in the tool string. Adding two communication channels on a single wire communication bus running the length of the tool string allows the use of existing tool joints to connect the tool assemblies. Thus, a plurality of first tool assemblies capable of using only the low speed communication channel may operate and function together with a plurality of second tool assemblies that make use of the high speed communication channel.

Figure 1:
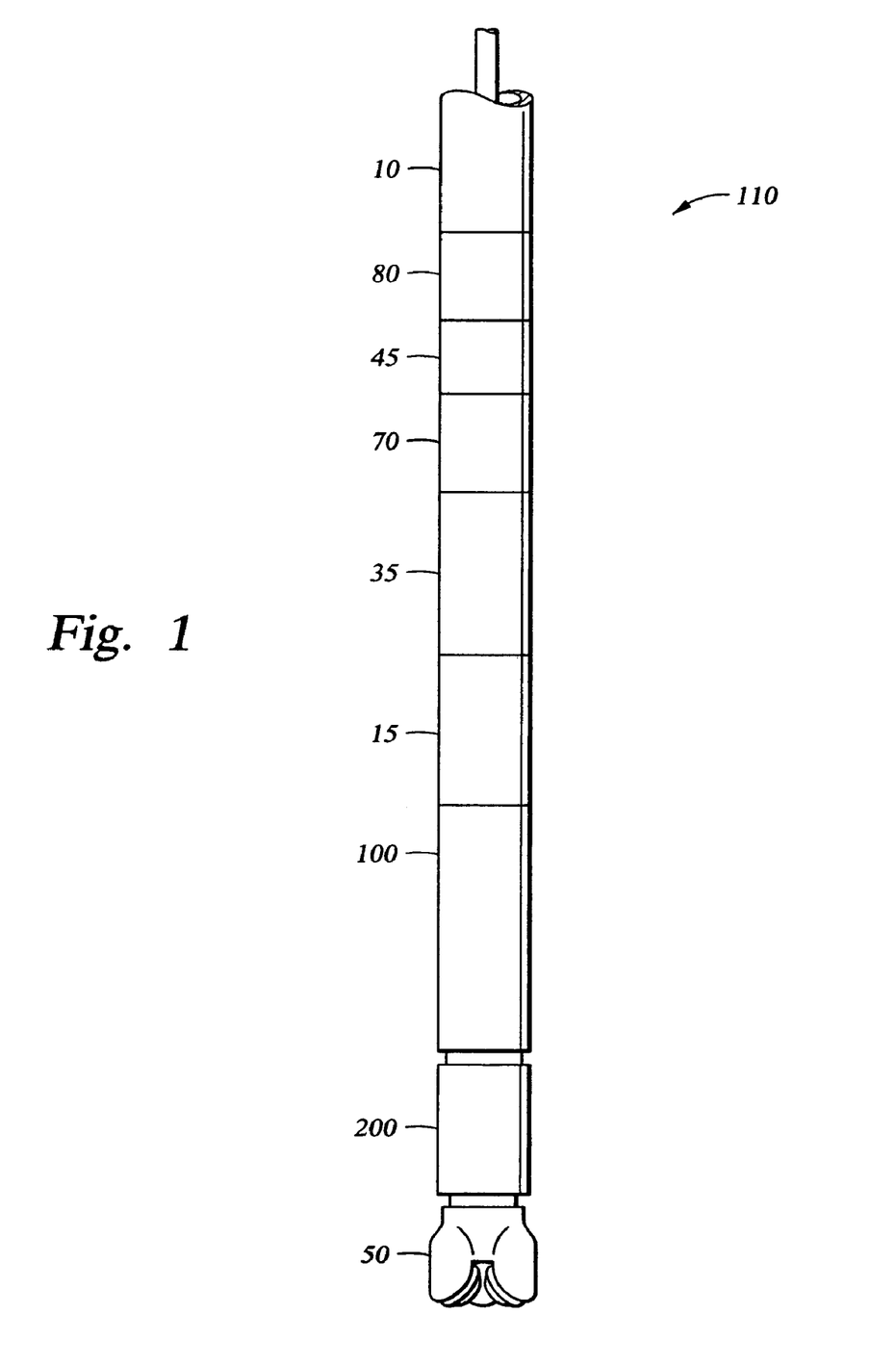
FIG. 1 is a schematic diagram of one embodiment of a tool string for a data telemetry system, which utilizes a driveshaft extension connected to a drill bit.

FIG. 1 shows a tool string 110 including a number of tool assemblies 15 and 80 for acquisition of data from a borehole in an earth formation. The tool string 110 comprises a bottom-hole assembly having a drill bit 50, a motor assembly 100 with a driveshaft extension assembly 200 connected to the drill bit 50, a pulser collar assembly 35 positioned uphole from the motor assembly 100, a control module (not shown) located in tool assembly 45 near the pulser collar assembly 35, a host module assembly 10, and a guard assembly 70. A drill collar (not shown) and the drill string (not shown) connect the downhole assemblies to the drilling rig (not shown). The drill string may include a single wire cable for transmitting power from the surface to the downhole tool assemblies. Tool assemblies 15 and 80 contain hardware and software for collection and processing of formation data in the borehole.

In some embodiments of the invention, motor assembly 100 may be a positive to displacement motor with a straight housing as shown in FIG. 1 or a bent housing (not shown). Other motors, including mud turbines, mud motors, Moineau motors, creepy crawlers and other devices that generate motion at one end relative to the other, may be used. Motor assembly 100 connects to driveshaft extension assembly 200 which may house a sensor module (not shown) to detect the direction and inclination of the drill bit 50. Extension assembly 200 includes a hollow cylindrical chamber with an interior defined by a first reduced diameter bore section, a second larger diameter bore-back section and an intermediate bore section providing a stepped transition from the reduced bore section to the enlarged bore-back section. The exterior of extension assembly 200 has a generally cylindrical configuration as shown in FIG. 1.

Figure 2:
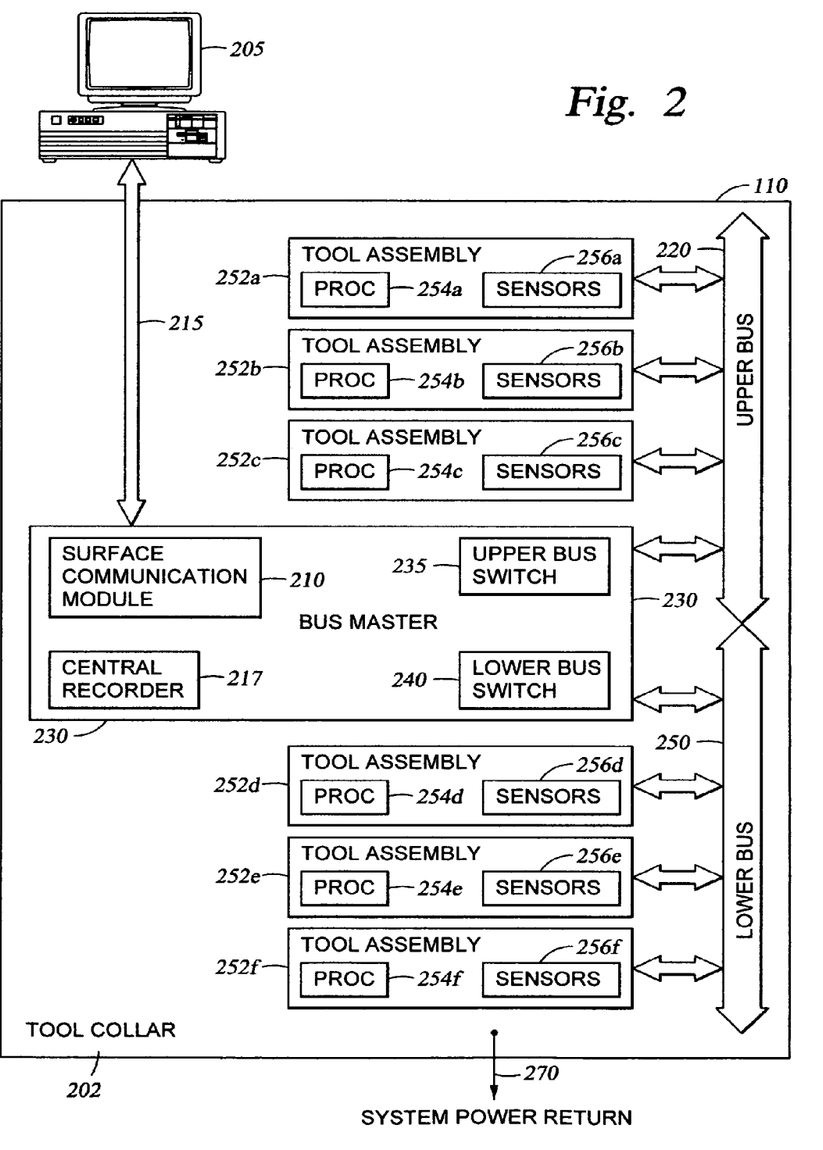
FIG. 2 shows the architecture of a tool string connecting tool assemblies that use the high speed communication system in accordance with some embodiments of the invention.

Turning now to FIG. 2, the architecture of a tool string 110 connecting tool assemblies 252 that use the high speed communication system is shown for some embodiments of the invention. A computer system 205 on the surface may be coupled to bus master 230. Bus master 230 may include surface communication module 210 that transmits and receives information from computer system 205 through communication path 215. Bus master 230 may include a central recorder 217, upper bus switch 235 and a lower bus switch 240. In some embodiments of the invention, bus master 230 may be coupled to tool assemblies 252a, 252b, and 252c through an upper bus 220. Bus master 230 may also couple to tool assemblies 252d, 252e, and 252f through lower bus 250. Each of the tool assemblies 252 may include one or more processors 254, memory (not shown), sensors 256, transducers (not shown), actuators (not shown), and communication circuitry (not shown). System power return 270 may couple to tool collar 202 on the outer body of the tool string 110.

Describing FIG. 2 in more detail, computer system 205 may be a stand-alone personal computer or workstation that stores information for later analysis offsite or may communicate the information through a wireless or wired medium to a receiving station (not shown) for real time data analysis. For some embodiments of the invention, pulses in the borehole mud or fluid generated by surface communication module 210 that may be a pulser modem may travel through path 215 to allow the transfer of information between the tool string 110 and computer system 205. More detailed information about the earth formation may be stored on a central recorder 217 located in bus master 230 for retrieval and downloading after the tool string 110 has been removed from the borehole. In some embodiments of the invention, central recorder 217 may be random-access-memory (RAM), FLASH memory, or Electronically-Programmable-Read-Only-Memory (EPROM). In some other embodiments, central recorder 217 may be a tape recorder system, compact disc read/writable (CD R/W) recorder system, or digital video disc (DVD R/W) recorder system.

Upper bus signal line 220 and lower bus signal line 250 may be a single cable traveling the length of the tool string 110. Communication between tool assemblies 252 and bus master 230 through upper bus signal line 220 or lower bus signal line 250 may be based on a master/slave communication protocol such as Military Standard 1553 (MIL-STD-1553), published Sep. 21, 1978 or a simplified version of this protocol. In accordance with some embodiments of the invention as described below with reference to FIG. 4, the single cable running the length of the tool string carrying a first signal based on MIL-STD-1553 over a first range of frequencies may also carry another signal using the same protocol or a different protocol over a second range of frequencies. The second signal may travel at much higher data transfer rates over a large bandwidth of frequencies and may be referred to as a high speed signal. Each of the first signal and the second signal may contain data traveling down the borehole and up the borehole at the same time with the opposite directions separated in frequency within the frequency ranges. Spread spectrum technology may be applied to the first signal and the second signal traveling on the cable to improve the signal's immunity to noise. Thus, duplex communications is possible between surface instrumentation and downhole instrumentation or between one downhole tool assembly and another downhole tool assembly.

Based on the protocol used for the second signal, the information in the second signal may be compressed to transfer larger quantities of information between tool assemblies over a shorter period of time. The selected protocol for the second signal may also permit tool assemblies to directly communicate with each other using peer-to-peer communication and allow direct global broadcasts from one tool assembly to a group of tool assemblies in the tool string 110.

In some embodiments of the invention, the protocol used for the second signal may be a Controller-Area-Network (CAN) protocol based on the single-wire ISO 11898 standard, published February 2000. CAN is a serial bus network that connects processors, memory, sensors, actuators, and other electronic devices in a system for real time control applications. Information coded as messages are broadcast to all members in the network using an identifier unique to the network. A member may be thought of as any intelligent piece of hardware that listens or talks over the bus. Based on the identifier, individual members decide whether or not to process the message and also determine the priority of the message in terms of competition for bus access. This technique allows for uninterrupted transmission even when two or more devices attempt to send a signal along the bus at the same time.

Bus master 230 may implement MIL-SID-ISS3 or a simplified version of this protocol to allow communication between tool assemblies 252 over upper bus signal line 220 or lower bus signal line 250. Bus master 230 may include an upper bus switch 235 and lower bus switch 240 that may be implemented in hardware or software. The bus master 230 may allow tool assemblies 252a, 252b, or 252c to communicate with tool assemblies 252d, 252e, or 252f by switching on upper bus switch 235 and lower bus switch 240. Information transfer from tool assemblies 252a, 252b, or 252c through the upper bus to surface computer 205 through surface communication module 210 may occur when the bus master switches upper bus switch 235 on. Similarly, information transfer from tool assemblies 252d, 252e, or 252f through the lower bus to surface computer 205 through surface communication module 210 may occur when the bus master switches lower bus switch 240 on.

As mentioned above, bus master 230 may also include a central recorder 217 that stores information relating to downhole conditions and formation properties collected by tool assemblies 252 and transmit to the recorder. After retrieval of the tool string from the borehole, information stored in central recorder 217 may be downloaded to computer system 205 by connecting the tool assembly containing the central recorder through a cable to the computer system.

Each of the tool assemblies 252a-252f may include one or more processors 254, memory (not shown), sensors 256, transducers (not shown), actuators (not shown), and communication circuitry (not shown). Processors 254a-254f may be an Intel® based Pentium® 4 processor, PowerPC™ based processor, ARM core based processor, digital signal processor or any logic device with similar functionality. Communication circuitry that may be present in tool assemblies' 252a-252f may include an UHF transceiver such as a Xemics XE1203 TrueRF™ containing a modulator/demodulator as described in Xemics Datasheet XE1203 TrueRF™ located at http://www.xemics.com/. The modulator and demodulator in the transceiver are capable of frequency shifting a communication signal into a higher or lower band of frequencies, respectively. Sensors 256a-256f monitor operational, directional and environmental parameters in the borehole and provide an electrical data signal indicative thereof.

Figure 3:
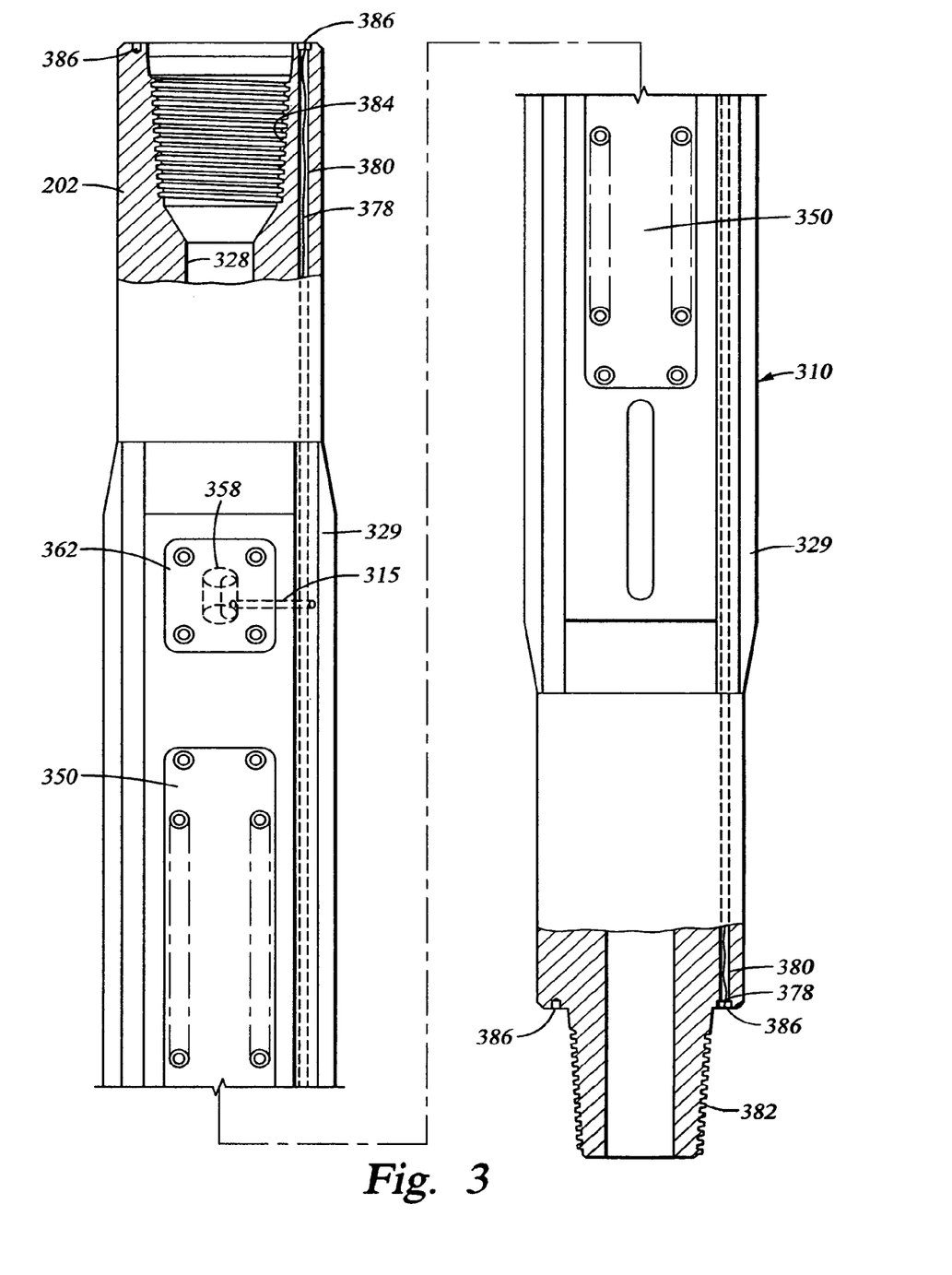
FIG. 3 is a side elevation view, partly in cross section, of a tool assembly in accordance with some embodiments of the invention.

Turning now to FIG. 3, a side elevation view, partly in cross section, of a tool assembly 310 in accordance with some embodiments of the invention is shown. Multiple tool assemblies may be attached together using connection module pin 382 and connection module box 384 to form the tool string as shown in FIG. 1. The tool assembly comprises a steel tool collar subassembly 202 having an axial opening 328 along the length thereof. Tool assembly 310 includes equispaced chambers or hatches running the length of central portion 329 for housing the tool electronics 254, sensors and actuators 256 as shown in FIG. 2. The hatches are machined pockets and each includes a precision surface to permit the formation of a high pressure seal with a hatch cover 350. The central portion 329 of tool assembly 310, which includes the hatches, has an increased diameter relative to the opposed ends of tool 310. For example, if the ends of tool 310 have a 6.75 inch outer diameter, central portion 329 may have a 7.5 inch outer diameter. Within this enlarged central portion 329 and between each hatch cover are longitudinal passageways. The passageways provide increased flow of drilling fluid between tool assembly 310 and the borehole wall.

FIG. 3 also includes a junction hatch 358 in the central portion 329 of tool assembly 310. The junction hatch 358 is associated with a junction hatch cover 362. Cover 362 utilizes an O-ring (not shown) to form a high pressure fluid tight seal with the flat surface surrounding hatch 358. Junction hatch 358 provides a chamber for effecting an electrical connection between the electronics disposed in the hatches and includes a modular connector that may couple with an external connector to allow retrieval of data stored on a recorder (not shown in FIG. 3), as described above, in tool assembly 310.

Tool assembly 310 that is included in tool string 110 utilizes a bus which comprises a single wire 378 that runs the full length of tool assembly 310 through a longitudinal bore 380 (parallel to the centerline of the tool) and is used to supply both power and communications to all members in the tool string. Single wire bus 378 is connected to the electronics located in the hatches and modular connector in junction hatch 358 via electric connectors. FIG. 3 shows electrical connector 315 coupled to the modular connector in junction hatch 358 and single wire bus 378. A power return is established for the system by using the steel tool collar 202 (that composes the body of tool 310) as the common return path and system ground.

As shown in FIG. 1 and described above, tool assembly 310 may be physically attached to other tool assemblies to form tool string 110. The construction of tool assembly 310 discussed above (including the power and communications wire 378 and hatches) lends itself for use as a neutron porosity device tool, gamma density device tool or other downhole LWD tools. Accordingly, each end of tool assembly 310 is designed to attach to adjacent tool assemblies and form a tool string; As shown in FIG. 3, when the pin 382 and box 384 of two adjacent tool assemblies are mated, ring connectors 386 inside the joint establish continuity for the single wire bus 378 in bore 380. Ring connector 386 comprises a substantially circular metal ring shown in cross-section in FIG. 3 around the circumference of tool assembly 310. The power returns of the two tools are also joined because the pin and box threads are making electrical contact. Thus, the tool assembly may be a two conductor system comprising the single wire bus 378 and tool collar 202.

As described above, bore 380 comprises a single wire bus 378 that supplies power to any tool assembly 310 that is connected in the tool string 110. Single wire bus 378 also allows bi-directional communication between all members in the tool assemblies or bus master. As described above, a member may be thought of as any intelligent piece of hardware that listens or talks over the single wire bus. Communications between members over single wire bus 378 may occur using either master/slave communication protocol such as MIL-STD-1553 or a simplified version of this protocol controlled by bus master 230. Communication between members may also occur using a peer-to-peer communication protocol such as Controller-Area-Network (CAN) that allows direct communication between members in tool assemblies 252 as described above with reference to FIG. 2.

Figure 4A:
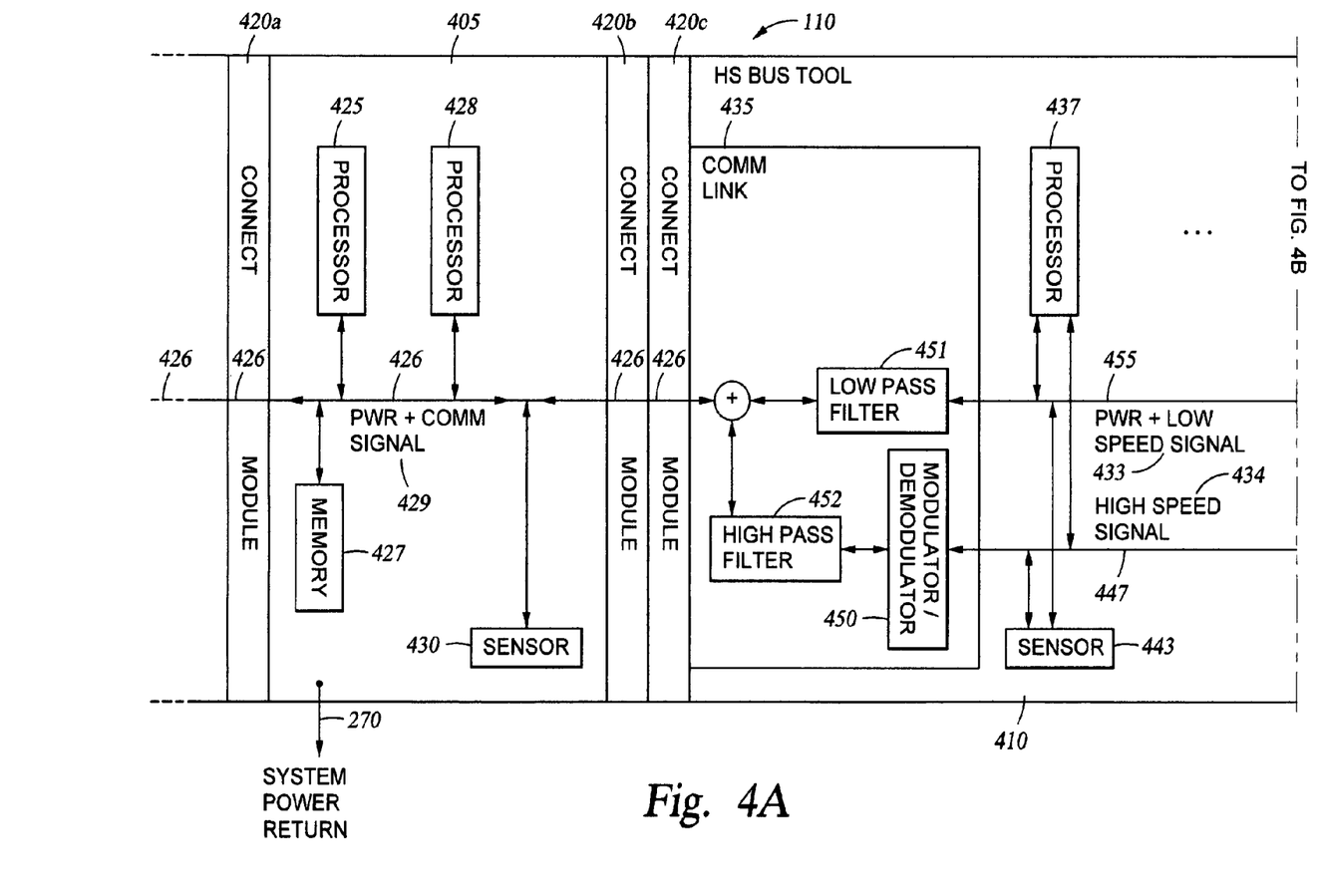
FIG. 4 shows, in accordance with one embodiment of the invention, a high performance communication system that connects the tool assemblies.
Figure 4B:
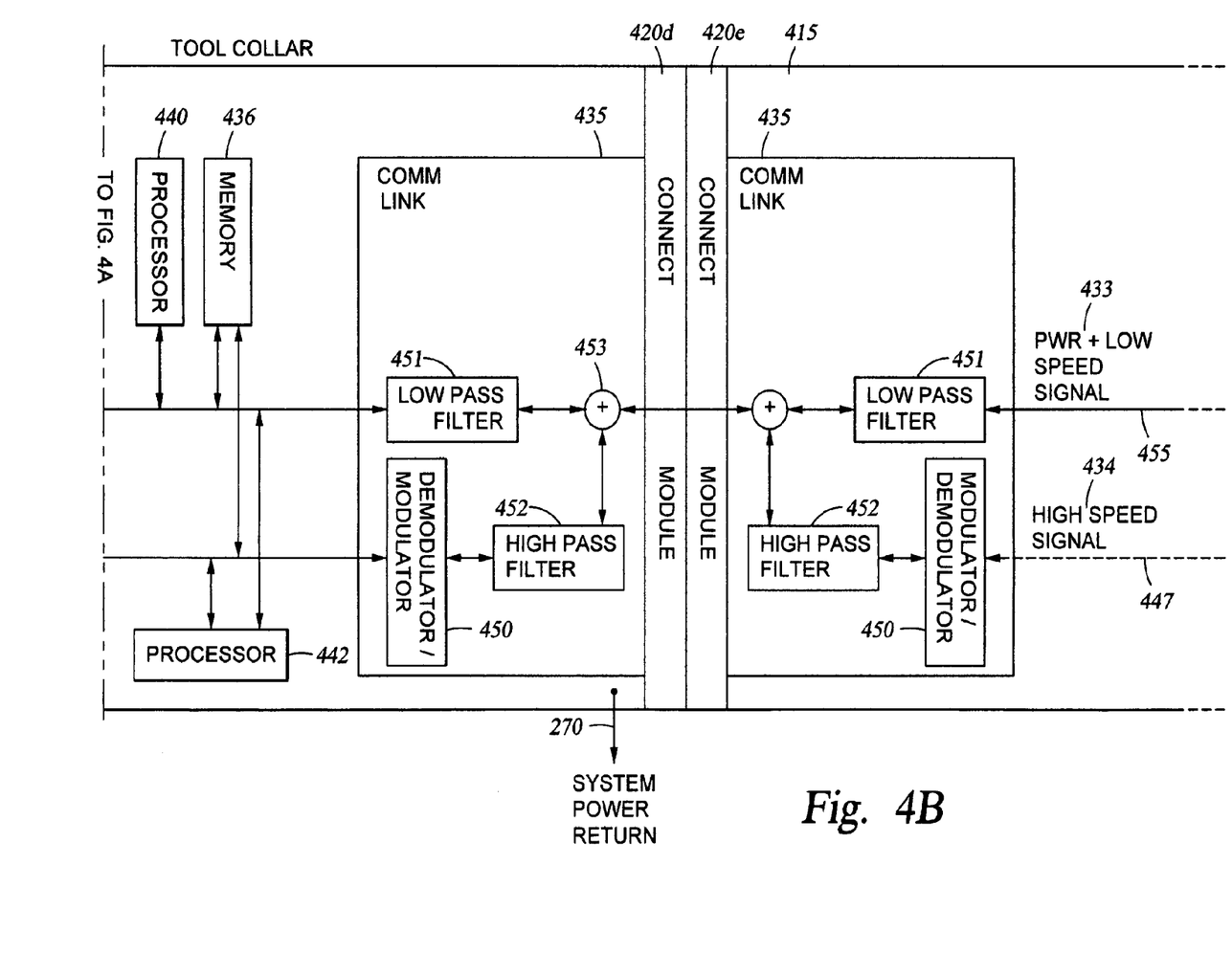

Turning now to FIG. 4, the architecture of a tool string 110 including the high performance communication system connecting tool assemblies 405, 410, and 415 is shown. As described above, a single wire cable 426 traveling the length of the tool string 110 carries power and communication signal 429 in tool assembly 405 and connect modules 420. A system power return 270 couples to the tool collar 202 forming a common return path and system ground. Thus, the tool assembly is a two conductor system created by the cable 426 and the tool collar 202.

Communication signal 429 may include a low speed signal over one band of frequencies using a variant of MIL-STD-1553 protocol. Communication signal 429 may also include a high speed signal over a band of frequencies different from the low speed signal. In some embodiments of the invention, the frequency band of the high speed signal may be 240 KHz to 1.5 MHz. In other embodiments, the frequency band of the high speed signal may be Ultra High Frequency (UHF) band in the range of 902-928 MHz or 2.4 GHz. Single wire cable 426 coupled to communication links 435 in tool assembly 410 and 415 may become cable 455 and carry power and the low speed signal 433 as described in detail below.

Tool assembly 405 includes processors 425 and 428 that couple to cable 426. One or more sensors 430, memory 427, transducers (not shown), and actuators (not shown) also couple to cable 426. Electronic devices that couple to cable 426 in tool assembly 405 receive power from the cable and transmit/receive information through the cable using the low speed signal that is part of the communication signal. As mentioned above, the low speed signal may use e.g., a master-slave communication protocol such as MIL-STD-1553.

At each end of tool assembly 405 is a connect module 420a and 420b that attaches to the connect module of another tool assembly. Thus, as shown in FIG. 4, connect module 420c in tool assembly 410 attaches to connect module 420b in tool assembly 405. The connect modules may be the pin and box structures as described in FIG. 3 above.

Tool assembly 410 attached to tool assembly 405 through the connect modules includes a communication link 435 that may be a transceiver containing a low pass filter 451, high pass filter 452, and modulator/demodulator 450. Communication links 435 isolate the electronics in tool assembly 410 from noise generated by power supplies and other electronics present in the tool string. As mentioned above, the communication link 435 may be a Xemics XE1203 TrueRF™ transceiver. In some embodiments of the invention, the communication link 435 may be a stand-alone module that connects to the tool assembly through cables 426, 455, and 447. Thus, communication link 435 may be powered from the power bus on cable 426 or 455.

Low pass filter 451 may couple cable 426 carrying power and communication signal 429 to cable 455 carrying power and low speed signal 433. The low pass filter 451 may output low frequency signal components below a cutoff frequency and may attenuate the remaining signal and noise components above the cutoff frequency. Thus, low pass filter 451 receives the power and communication signal 429 on cable 426 and outputs the power and low speed signal 433 that are at low frequencies below the cutoff frequency to cable 455 while attenuating the high speed signal 434.

High pass filter 452 couples cable 426 carrying power and communication signal 429 to modulator/demodulator 450. Modulator/demodulator 450 couples to cable 447 carrying high speed signal 434. The high pass filter 452 outputs high frequency signal components above a certain high frequency and attenuates the remaining signal and noise components below the high frequency. Thus, high pass filter 452 receives the power and communication signal 429 on cable 426 and outputs the high speed signal 434 that are at frequencies above the high frequency to modulator/demodulator 450 while attenuating the power and low speed signal 433. The high speed signal is then demodulated by modulator/demodulator 450 that frequency shifts the high speed signal into lower frequency bands. As mentioned above, cable 447 carrying high speed signal 434 may be a CAN bus that implements the CAN peer-to-peer communication protocol.

Communication link 435 including low pass filter 451, high pass filter 452 and modulator/demodulator 450 is capable of separating and frequency shifting a signal into higher/lower frequency bands, respectively. Thus, communication link 435 may separate the low speed signal and/or demodulate the high speed signal in the communication signal 429 on cable 426, respectively, into cable 455 and cable 447. Cable 455 would carry power and low speed signal 433 after filtering by low pass filter 451 and cable 447 would carry high speed signal 434 after filtering by high pass filter 452 and demodulation by modulator/demodulator 450. In particular, high speed signal in communication signal 429 that may be a high frequency broadband signal may be shifted to a lower baseband frequency range for access and use by processors 442 and 437, sensors 443, memory 436, and other electronic devices coupled to cable 447. Processors 442 and 437, sensors 443, and memory 436 may also couple to cable 455 to receive power from this cable.

Tool assembly 410 includes processor 437 that is coupled to both cable 455 and 447. In some embodiments of the invention, processor 437 may use both the high speed signal 434 and low speed signal 433 to access data and to communicate with other electronic devices. Processor 440 may couple to cable 455 to receive power and low speed signal 433 for communication with other electronic devices.

Communication link 435 attached to connect module 420d includes low pass filter 451 that couples to cable 455 carrying power and low speed signal 433. Communication link 435 also includes high pass filter 452 connected to modulator/demodulator 450 that couples to cable 447 carrying high speed signal 434 to cable 426 carrying power and communication signal 429. In some embodiments of the invention, modulator/demodulator 450 may modulate the high speed signal 434 on cable 447 from baseband frequency range to high frequency broadband signal. The modulated high speed signal may be filtered to remove any noise and low frequency components by high pass filter 452. Power and low speed signal 433 on cable 455 after being filtered to remove any noise and high frequency component by low pass filter 451 is combined with the high speed signal 434 on cable 447 in summing circuit 453 and transmit to tool assembly 415 through cable 426. As described above and shown in FIG. 4, cables 426, 447, and 455 containing the power and communication signal 426; high speed signal 434; and power and low speed signal 433, respectively, may each contain data traveling in opposite directions separated in frequency within the frequency ranges of each signal.

Memory 427 in tool assembly 405 and memory 436 in tool assembly 410 may be dynamic random access memory (DRAM) or non-volatile memory such as battery backed static random access memory (SRAM), FLASH memory, or optical storage. In some embodiments of the invention, memories 427 and 436 may be used to temporarily save information collected by their respective tool assemblies about the earth formation, and communicated to central recorder 217 shown in FIG. 2 for storage and retrieval by computer system 205. After communication to central recorder 217, memories 427 and 436 may be overwritten by new data collected by the tool assemblies. In some other embodiments, the information stored in memories 427 and 436 may be transferred to central recorder 217 but the memories may function as secondary backup to the recorder and retain the information in case the recorder has a hardware or power failure.

Figure 5:
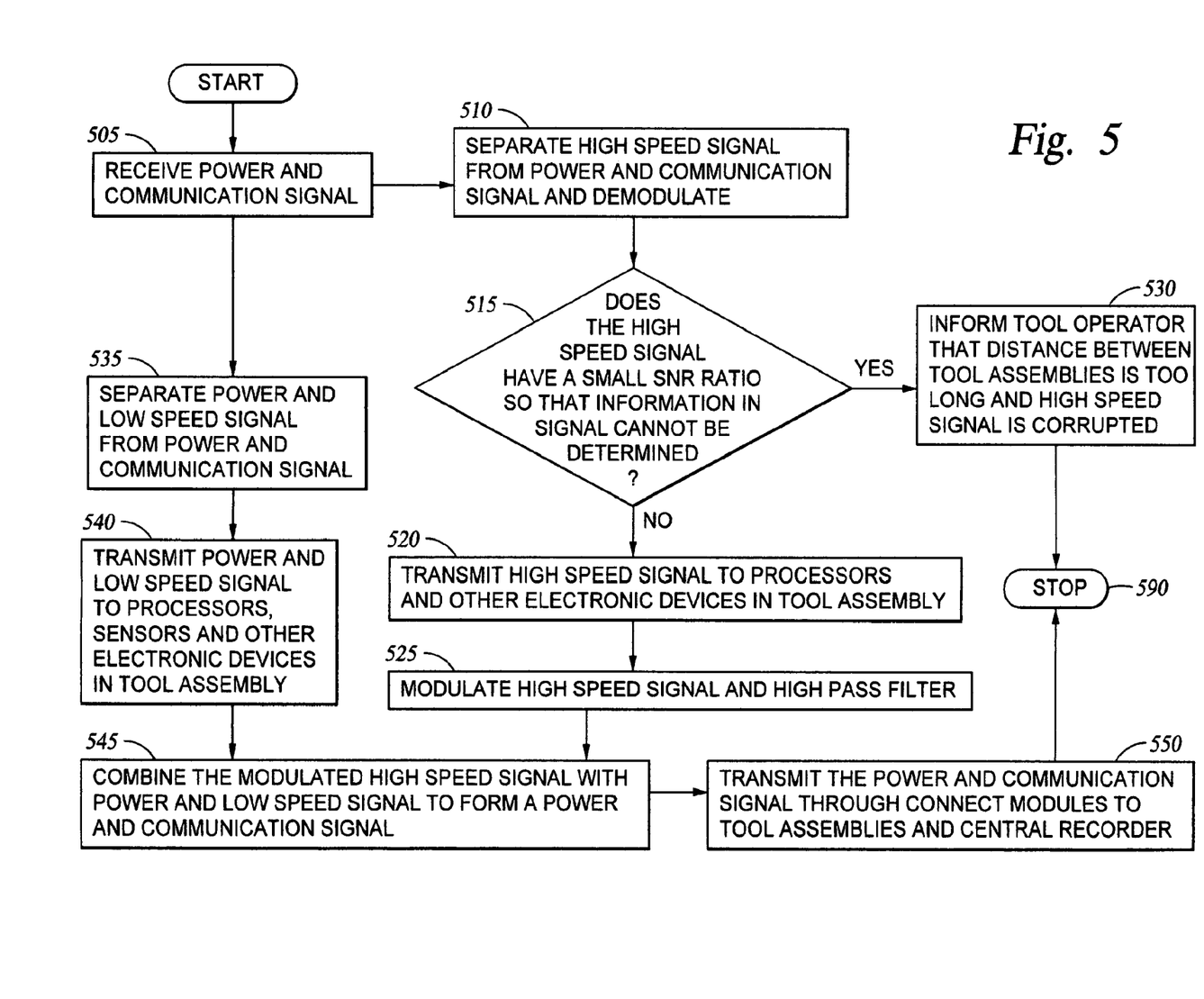
FIG. 5 is a flow chart showing, in accordance with one embodiment of the invention, a technique to demodulate and modulate the information signal in a tool assembly.

Referring now to FIG. 5, a flow chart, in accordance with one embodiment of the invention, shows a technique to demodulate and separate the high speed signal from the communication signal in a tool assembly. FIG. 5 also shows a technique to modulate the high speed signal into a high frequency broadband signal. The modulated high speed signal may be combined with power and low speed signal to form a power and communication signal that may be transmit over cable 426 through connect modules 420 to tool assemblies 405, 410, and 415.

Describing FIG. 5 in more detail, a power and communication signal is received in block 505 at a communication link 435 (FIG. 4). The power and communication signal includes a low speed signal, which, in block 535, is separated along with the power signal from the power and communication signal. The power and low speed signal is transmit to processors, sensors, memory, and other electronic devices in the tool assembly in block 540. The information contained in the low speed signal may be modified by the electronic devices for transmission to other devices in the tool assemblies.

The power and communication signal may also include a high speed signal which, in block 510, is separated by high pass filtering from the power and communication signal. The high speed signal is demodulated in block 510. Demodulation, as described above, includes shifting a signal at one frequency band to a lower frequency band. In block 515, if the high speed signal is noisy, thus having a small signal-to-noise ratio (SNR), so that information in the signal cannot be determined, then a tool operator is informed that the high speed signal is corrupted, block 530 and communication stopped in block 590. The high speed signal may be corrupted because of electromagnetic interference or because the distance between communication links 435 through connect modules 420 or tool assembly 405 is too large, thus degrading the signal level and consequently SNR. If the high speed signal is not corrupted by noise, then the high speed signal is transmit to processors and other electronic devices in the tool assembly as shown in block 520. The information contained in the high speed signal may be modified by the electronic devices for transmission to other devices in the tool assemblies. The high speed signal is transmit by the electronic devices to modulator/demodulator 450 (FIG. 4) where the signal is modulated. Modulation, as described above, includes shifting the high speed signal in one frequency band to a higher frequency band. The modulated high speed signal is filtered by high pass filter 452 (FIG. 4) as described above.

Modulated and filtered high speed signal from block 525 and power and low speed signal from block 540 are combined into a power and communication signal as shown in block 545. The power and communication signal is transmit through connect modules 420 and tool assembly 405 to the electronic devices and central recorder that stores the communication signal as shown in block 550.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A communication system, comprising:
    a main signal line including a first signal and a second signal, said first signal and second signal at different frequencies, wherein the second signal includes data from an earth formation;
    a second signal line coupled to the main signal line, said second signal line capable of receiving the first signal;
    a third signal line coupled to the main signal line, said third signal line capable of receiving the second signal; and
    one or more electronic devices coupled to the third signal line, said electronic devices capable of processing the data from the second signal.

2. The communication system of claim 1, further comprising one or more electronic devices coupled to the second signal line, wherein the first signal includes data from an earth formation, said electronic devices capable of processing the data from the first signal.

3. The communication system of claim 2, wherein the electronic devices are at least one of a processor, sensor, memory, or actuator.

4. The communication system of claim 1, further comprising a plurality of communication links, wherein the main signal line, the second signal line, and the third signal line couple to each other through the communication link.

5. The communication system of claim 4, further comprising a plurality of connection modules that each contain the main signal line, wherein two or more of the connection modules attach to a communication link.

6. The communication system of claim 5, wherein the connection modules attach together to form a tool string.

7. The communication system of claim 6, wherein each of the plurality of connection modules is a pin or box.

8. The communication system of claim 5, further comprising a system power return coupled to each of the plurality of connection modules.

9. The communication system of claim 4, wherein each of the communication links further comprises:
    a low pass filter coupled to the main signal line;
    a high pass filter coupled to the main signal line; and
    a modulator and demodulator coupled to the high pass filter.

10. The communication system of claim 1, wherein the first signal is a power and low speed signal.

11. The communication system of claim 1, wherein the second signal is a high speed signal.

* * * * *